United States Patent
Shi et al.

(10) Patent No.: US 12,333,260 B2
(45) Date of Patent: Jun. 17, 2025

(54) SCRIPT-BASED TASK ASSISTANCE

(71) Applicant: INTERNATIONAL BUSINESS MACHINES CORPORATION, Armonk, NY (US)

(72) Inventors: Jin Shi, Ningbo (CN); Chih-Yuan Lin, New Taipei (TW); Shu-Chih Chen, New Taipei (TW); Chao Yuan Huang, Taipei (TW); Pei-Yi Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 18/172,031

(22) Filed: Feb. 21, 2023

(65) Prior Publication Data
US 2024/0281612 A1 Aug. 22, 2024

(51) Int. Cl.
| | | |
|---|---|---|
| G06F 9/445 | (2018.01) | |
| G06F 3/0481 | (2022.01) | |
| G06F 3/04842 | (2022.01) | |
| G06F 9/455 | (2018.01) | |
| G06F 11/00 | (2006.01) | |
| G06F 11/36 | (2025.01) | |
| G06F 17/00 | (2019.01) | |

(Continued)

(52) U.S. Cl.
CPC ............ *G06F 40/35* (2020.01); *G06F 3/0481* (2013.01); *G06F 3/04842* (2013.01); *G06F 40/205* (2020.01)

(58) Field of Classification Search
CPC ...... G06F 40/35; G06F 40/205; G06F 3/0481; G06F 3/04842; G06F 11/3684; G06F 11/3688; G06F 11/3698; G06F 11/3696; G06F 11/3672; G06F 16/2358; G06F 11/3612; G06F 11/3692; G06F 11/3457; G06F 11/079; G06F 9/451; G06N 5/02
See application file for complete search history.

(56) References Cited

U.S. PATENT DOCUMENTS 7,895,576 B2 * 2/2011 Chang ................. G06F 11/3684
717/124
9,219,800 B2 * 12/2015 Jia ........................... G06F 11/30
(Continued)

FOREIGN PATENT DOCUMENTS

KR 2022023005 A 3/2022

OTHER PUBLICATIONS

Disclosed Anonymously, "A Method of Generating Hands-on Tours Based on Automated Scripts of UI Regression Test", IP.com Prior Art Database Technical Disclosure, IP.com No. IPCOM000269268D, Apr. 1, 2022, 4 pgs.

(Continued)

*Primary Examiner* — Thuy Dao
(74) *Attorney, Agent, or Firm* — Elliot J. Shine

(57) ABSTRACT

A method, computer system, and a computer program product for task assistance is provided. The present invention may include acquiring a request expression input by a user. The present invention may include identifying a request intent associated with a task based on the request expression. The present invention may include determining a response script corresponding to the request intent. The present invention may include executing the response script to complete the task and presenting the process of running the task in a user-interface (UI).

20 Claims, 9 Drawing Sheets

(51) Int. Cl.
  *G06F 40/205* (2020.01)
  *G06F 40/35* (2020.01)

(56) References Cited

U.S. PATENT DOCUMENTS

| | | |
|---|---|---|
| 2019/0037077 A1 | 1/2019 | Konig |
| 2020/0150839 A1 | 5/2020 | Roisman |
| 2020/0158780 A1 | 5/2020 | Ranganathan |
| 2021/0264804 A1 | 8/2021 | Venkatasubramanyam |
| 2021/0329128 A1 | 10/2021 | Kadakia |

OTHER PUBLICATIONS

Reddy, "RPA Bots: Understanding the Chatbot and RPA Integration", Acuvate BotCore, Dec. 10, 2018, 6 pgs., <https://botcore.ai/blog/rpa-bots-understanding-the-chatbot-and-rpa-integration/>.

* cited by examiner

| | |
|---|---|
| 1 | Feature: To-Do List |
| 2 | |
| 3 | As a busy person, I want to be able to keep track of my tasks so that I can stay organized and productive. |
| 4 | |
| 5 | Scenario: Adding a new task to the to-do list |
| 6 | |
| 7 | Given that I am on the to-do list page |
| 8 | When I enter a new task into the "Add task" field |
| 9 | And I click the "Add" Button |
| 10 | Then the new task should be added to the list of tasks |
| 11 | |
| 12 | Scenario: Marking a task as complete |
| 13 | |
| 14 | Given that I have a task on my to-do list |
| 15 | When I click the checkbox next to the task |
| 16 | Then the task should be marked as complete |
| 17 | And the task should be crossed out on the list |
| 18 | |
| 19 | Scenario: Removing a task from the list |
| 20 | |
| 21 | Given that I have a task on my to-do list |
| 22 | When I click the "Remove" button next to the task |
| 23 | Then the task should be removed from the list |

FIG. 2

SCRIPT-BASED TASK ASSISTANCE

BACKGROUND

The present invention relates generally to the field of computing, and more particularly to task assistance within a user interface (UI).

With the functionality of software systems becoming more and more complex, a user may be able to complete various tasks as desired by operating a software system. However, for some functionalities that may be unfamiliar to the user, for example, the user may be using an application for the first time and/or the application may have recently undergone a software update resulting in updated and/or new functionalities.

Accordingly, improved task assistance within the UI which may provide a more immersive interaction with the user and perform an intent-directed operation for a task may be helpful in aiding the user in completing one or more tasks.

SUMMARY

Embodiments of the present invention disclose a method, computer system, and a computer program product for task assistance. The present invention may include acquiring a request expression input by a user. The present invention may include identifying a request intent associated with a task based on the request expression. The present invention may include determining a response script corresponding to the request intent, in response to the request intent being mapped to a testing intent in intent-script mapping data. The present invention may include executing the response script to complete the task and presenting the process of running the task in a user-interface (UI), wherein the intent-script mapping data indicates correspondence between each of the one or more test scripts and a testing intent thereof, and wherein the response script is generated based on a test script of the one or more test scripts.

In another embodiment, the method may include parsing each of the one or more tests scripts into a set of first structural data; identifying the testing intent corresponding to each of the one or more test scripts using natural language understanding (NLU) based on the set of first structural data; and generating the intent-script mapping data based on the identified testing intent corresponding to each of the one or more test scripts.

In a further embodiment, the method may include acquiring a Behavior-Driven Development (BDD) script associated with each of the one or more test scripts; parsing the BDD script into a set of second structural data; identifying the testing intent corresponding to the test script associated with the BDD script using NLU based on the set of second structural data; and generating the intent-script mapping data based on the identified testing intent corresponding to each of the one or more test scripts.

In yet another embodiment, the method may include generating an interactive response recommendation in response to the request intent being mapped to a testing intent in the intent-script mapping data; presenting the interactive response recommendation to the user by the UI; and executing the response script in response to the user accepting the interactive response recommendation.

In addition to a method, additional embodiments are directed to a computer system and a computer program product for task assistance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 shows an exemplary BDD script according to an embodiment of the present disclosure;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
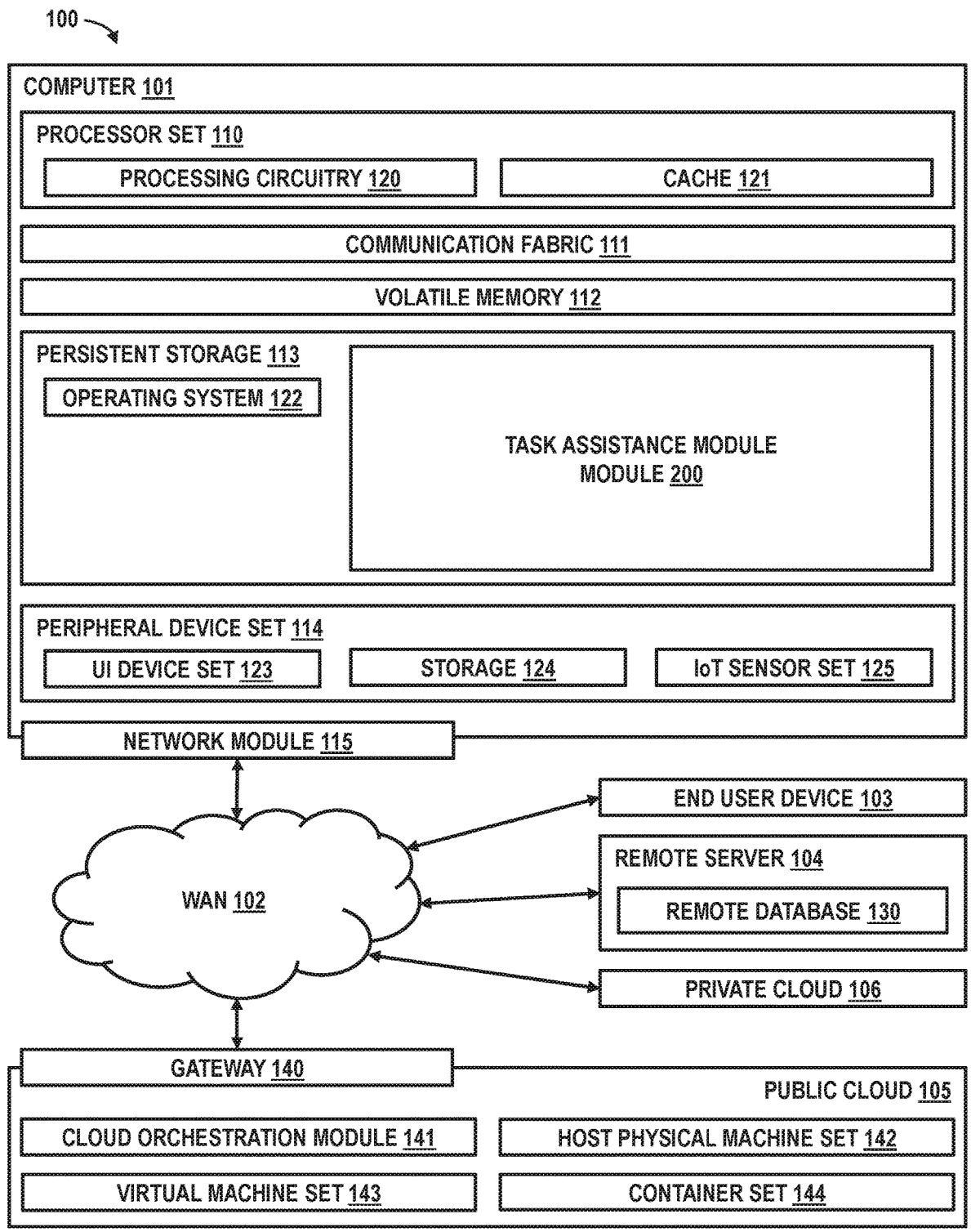
FIG. 1 shows an exemplary computing environment which is applicable to implement the embodiments of the present disclosure.

Referring to FIG. 1, Computing environment 100 contains an example of an environment for the execution of at least some of the computer code involved in performing the inventive methods, such as task assistance module 200. In addition to the task assistance module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

As mentioned above, for some functionalities in a software system that users are unfamiliar, such as new functions or the latest updated functions, it may be necessary to provide task assistance to guide users to complete tasks.

Typically, a tutorial based guidance such as help documents or Knowledge Center can be disposed within the UI of the software system for guiding the user, but it would be time and labor consuming for learning a new functionality before using, because the user has to retrieve the knowledge related to his/her intent throughout the whole document, then follow the steps to complete the task, and in such a manner of "learn before use", the user may repeatedly return to the tutorial for help when encountering a problem, resulting in interruption or restart of the operation. Alternatively, a chatbot may be disposed in the UI to provide assistance to the user by dialogue, but a text-based interaction may not be intuitive, and due to a limited functionality of the chatbot, users' problems often cannot be effectively solved or may even be misled, and the user might still be directed to other reference links for help.

In view of above problems, there exists a need for an improved task assistance, which can provide a more immersive interaction with the user and perform an intent-directed operation for the task.

In the phase of program development, programmers need to communicate requirements frequently to complete the development of a specific functionality. In order to make the requirements consistent, the current practice is to use a text file (typically, a Behavior-Driven Development (BDD) script) that is closer to natural language to describe and specify the functionality to be developed. In this way, developers design program codes based on the BDD script, and testers implement test codes based on the same BDD script to test the designed functionality, so that the functionality of the final product can be consistent with the described functions from perspective of the user.

FIG. 2 shows an exemplary BDD script according to an embodiment of the present disclosure. As shown in FIG. 2, in order to implement a functionality of "To-do List", a BDD script can be used to describe scenarios and intention of a specific functionality. In this example, the BDD script may specify an expected purpose of this functionality and three related scenarios in a specific format by using for example, a syntax referred to as Gherkin, such that programmers can use specific keywords such as "Feature", "Scenario", "Given", "When" and "Then" to describe functions in a manner of natural language description.

As mentioned above, testers can program test scripts with different testing purposes (i.e., testing intent) based on the BDD scripts to test a respective functionality. Before the product goes online, each functionality of the product needs to be tested. Only when a specific functionality can be correctly realized by running the test script, this functionality passes the test. In other words, a test script with a test intent can be used to implement the respective functionality of the final product, and each test script is also naturally compatible with the latest version of the functionality.

At least based on the recognition of the above characteristics, embodiments of the present disclosure propose a method, system and computer program product for a script-based task assistance, in order to solve at least one of the technical problems described above.

Through the embodiments of the present disclosure, an improved task assistance can identify user's intent, then assist the user to execute and complete a task automatically based on a script generated from a test script used for testing a respective functionality associated with the task, to obtain a desired result of the task correctly. In addition, procedures of completing the task can be presented to the user in real-time while executing the task. In this way, the user can not only realize his/her intent accurately, but also know the details and procedure of the operation, which facilitates learning and operation of a new functionality.

Figure 3:
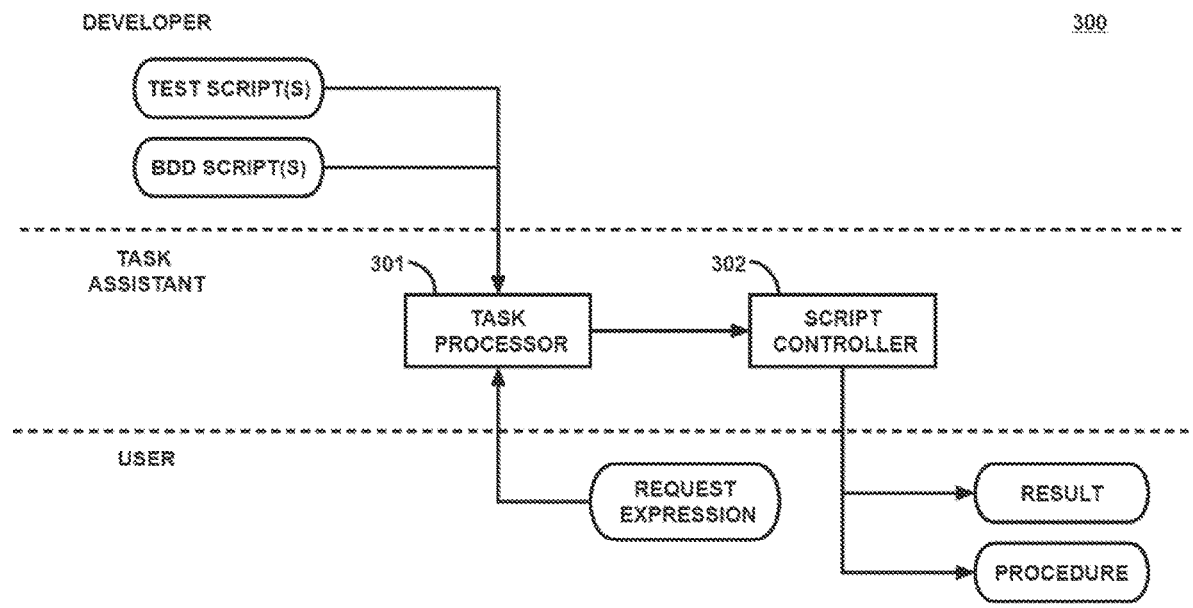
FIG. 3 shows an exemplary architecture of a system for task assistance according to an embodiment of the present disclosure.

FIG. 3 shows an exemplary architecture of a system 300 for task assistance according to an embodiment of the present disclosure. As shown in FIG. 3, the system 300 can include a task processor 301 and a script controller 302. It should be noted that the shown architecture is only exemplary, and the system 300 may include additional elements in addition to the components as shown. Also, the processing of task assistance according to embodiments of this disclosure could be implemented in the computing environment of FIG. 1.

The task processor 301 can be configured to acquire a request expression input by a user. In the context of the present disclosure, the term "request expression" can refer to an expression that a user requests to complete a certain task, and therefore the request expression can indicate an intent of the user that there is a desired task to be completed by a software system of the computer. The term "task" can refer to a single operation or a series of operations performed by the software system, such as providing desired information, or running a specific application.

In embodiments of present disclosure, there are various ways to acquire the request expression, for example, user may input the request expression by entering texts in a textbox or a chatbot within the UI through an input device such as keyboard or writing pad, clicking a certain graphic element(s) within the UI through an input device such as a mouse or stylus, and inputting a speech or gesture through a microphone or camera, or any combination thereof. The input request expression can then be acquired by the task processor 301 for further processing.

The task processor 301 can be further configured to identify a request intent associated with a task based on the request expression. As mentioned above, the request expression can indicate an intention of the user, which is associated with a desired task to be completed. According to an embodiment of present disclosure, the task processor 301 may extract the keyword from the request expression for identifying a request intent associated with a task. For example, in a case that the user enters "I want to get my salary statement" in a textbox (e.g., a dialog box with a chatbot), which is an example of the request expression, the task processor 301 may extract "get salary statement" as the keyword, and then identify the request intent as "Query Salary" based on a predetermined rule. Such an intent of "Query Salary" can indicate that the computer shall perform an operation(s) to query the salary of the user to complete the task associated with the intent of "Query Salary".

The task processor 301 can be further configured to determine a response script corresponding to the request intent, in response to the request intent being mapped to a testing intent in intent-script mapping data, wherein the intent-script mapping data indicates correspondence between each of one or more test scripts and a testing intent thereof, and the response script is generated based on a test script of the one or more test scripts. According to an embodiment of present disclosure, the task processor 301 may pre-store or be able to acquire from an external source one or more scripts including test scripts, BDD scripts, and the like. As mentioned above, the request intent is associated with a task, and a test script used for testing a respective functionality associated with the task, which can be indicated by a testing intent, thus the task processor 301 may search for a test script used for testing a respective functionality associated with the request intent, based on intent-script mapping data (e.g., in a form of metadata) indicating the correspondence between each of one or more test scripts and a testing intent thereof. Detailed descriptions of examples of generating the intent-script mapping data will be described later with reference to FIG. 5 and FIG. 6.

If the request intent can be mapped to a testing intent based on the intent-script mapping, then the task processor 301 can determine a response script to be executed, wherein the response script is generated based on the mapped test script. According to an embodiment of present disclosure, the response script can be converted from the mapped test script, for example, a script converter (not shown) which is integrated with or separate from the task processor 301 may be configured to convert an unattended text script into an attended RPA (Robotic Process Automation) script by replacing default information for testing purpose with the information that needs to be filled by user interaction or any other appropriated method. Alternatively, the task processor 301 may determine the mapped test script as the response script corresponding to the request intent directly.

The script controller 302 can be configured to acquire, from the task processor 301 or a script converter, a response script, and run the response script to complete the task associated with the request intent identified by the task processor 301. Also, in a manner of running a script to execute an operation(s) for completing a task, the procedure of executing the operation(s) can be presented step-by-step within the UI, just as operating an application on the client side from perspective of the user.

As mentioned above, through the embodiments of the present disclosure, an improved task assistance can identify user's intent, and then assist the user to complete a task automatically based on a respective script, such that a desired result of the task as well as the process of obtaining the result by running the script can be presented to the user. In this way, by reuse of existing script documents in the development and design stage, not only the repetitive workload of the developers can be saved, but also a functionality consistent with the expected result can be achieved. In addition, from the user's point of view, the requested intent can be realized more accurately, and the user also can know the details and procedure of the operation, which facilitates learning and operation of a new functionality.

Figure 4:
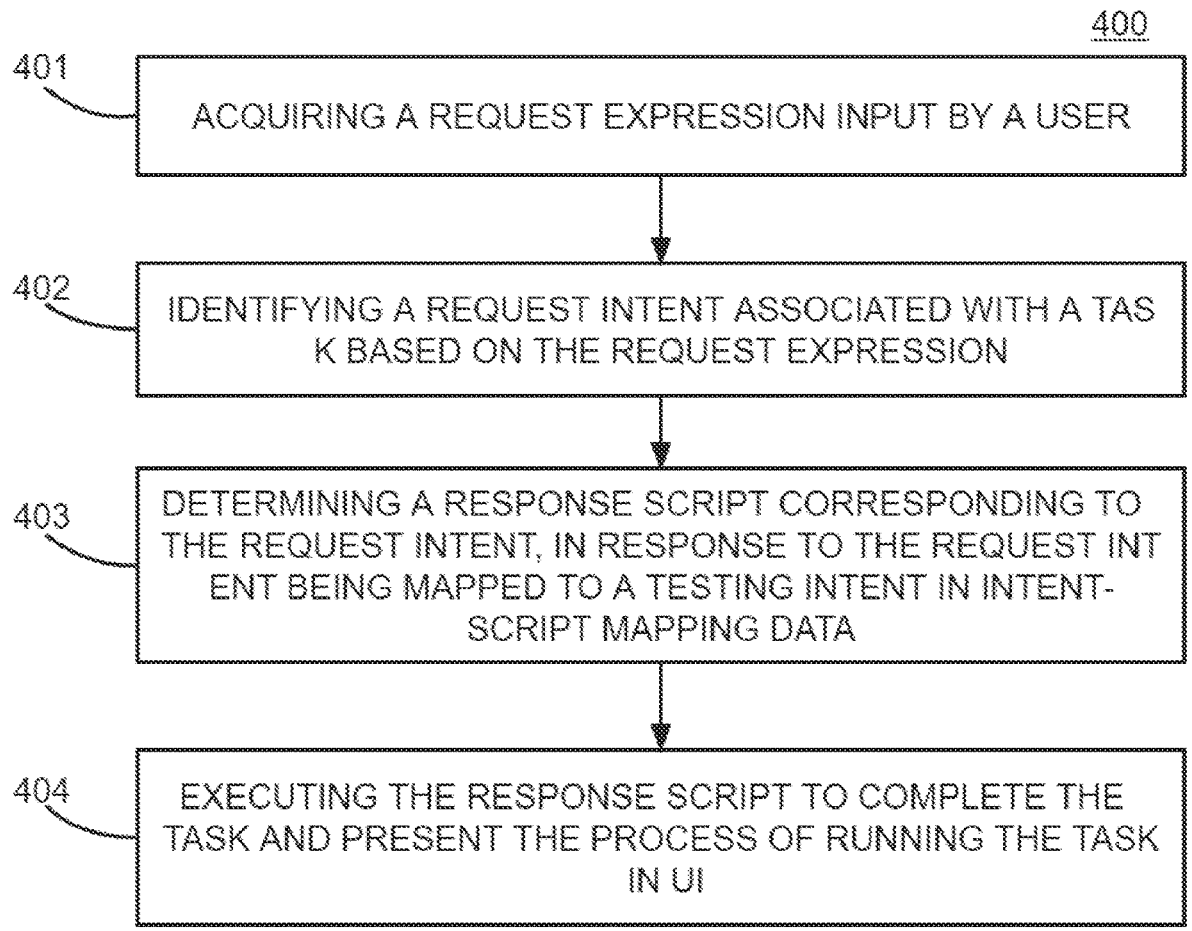
FIG. 4 shows an exemplary flowchart of a computer-implemented method for task assistance according to an embodiment of the present disclosure.

FIG. 4 shows a flowchart of a computer-implemented method 400 for task assistance according to an embodiment of the present disclosure. As shown in FIG. 4, method 400 comprises steps 401-404. It should note that the method 400 may be executed in any of the environments described with reference to accompanying drawings according to the present disclosure. For example, each step of method 400 can be performed by one or more processing units in a system for task assistance, such as central processing units (CPUs), and an exemplary architecture of the system for task assistance has been described as above with reference to FIG. 3.

At step 401, a request expression input from a user can be acquired. As mentioned above, there are various ways to acquire the request expression of the user. According to an embodiment of present disclosure, a request expression can be acquired by interacting with the user via a chatbot. For example, in the human resources webpage of a company website with disposing a help chatbot, an employee who wants to query his/her salary may enter "I want to get my salary statement" in a dialog box with the chatbot, and the entered text can be regarded as the request expression of the user.

At step 402, a request intent associated with a task can be identified based on the request expression. As mentioned above, a request intent associated with a task can be identified by extracting the keyword from the acquired request expression from the user. Continuing with above example of querying salary, based on a request expression of "I want to get my salary statement" from the user, the request intent can be identified as "Query Salary". According to an embodiment of present disclosure, a classifier can be used to identify the request intent. As an example, the classifier can be constructed by using historical request expressions, for example, a machine learning based-classifier can be trained by using historical request expressions as training samples, which are acquired from chatting records between the user and a chatbot or a human customer service, and each of the chatting records is associated with a respective request intent. Detailed descriptions of examples of constructing the classifier will be described later with reference to FIG. 8.

At step 403, in response to the request intent being mapped to a testing intent in intent-script mapping data, a response script corresponding to the request intent can be determined. As mentioned above, based on an intent-script mapping indicating the correspondence between each of one or more test scripts and a testing intent thereof, a test script used for testing a respective functionality can be matched with the identified request intent among a set of test scripts. If a test script corresponding to a testing intent same as the request intent can be retrieved in the set of test scripts, it is determined that the testing intent associated with the test script matches with the request intent, that is, the request intent is mapped to a testing intent in the intent-script mapping data.

In response to the request intent being mapped to a testing intent in the intent-script mapping data, a response script corresponding to the request intent can then be determined, wherein the response script is generated based on a test script of the one or more test scripts. For example, as mentioned above, the response script can be converted from the mapped test script; alternatively, the mapped test script can be used as the response script directly, depending on the task to be completed. According to an embodiment of present disclosure, if the task to be completed associated with the request intent is required to interact with the user, for example, in above example of querying salary, user custom information including personal information (e.g., account ID, password, etc.), preference information (month/year for querying salary), and the like, needs to be filled in the webpage, the response script can be generated by converting an unattended text script into an attended script, by replacing default information for testing purpose with the information that needs to be filled by user interaction, such that the user custom information can be acquired as appropriate during assisting the user by interacting with the user in an immersive manner. In this case, the response script to be executed is an attended script converted from a test script.

At step 404, the response script can be executed to complete the task and present the process of running the task in a UI. As mentioned above, since a test script is used to implement a respective functionality and also naturally compatible with the latest version of the functionality, by executing the response script generated based on the test script corresponding to the request intent, the task associated with the request intent can be completed. In addition, the executed code of response script is a black box for the programmers of the assistance system, and the respective functionality can be can realized without redesigning the code. In addition, in a manner of running a script to execute an operation(s) for completing the task, the procedure of executing the operation(s) can be presented step-by-step within the UI, just as operating an application on the client side from perspective of the user.

According to an embodiment of present disclosure, since the response script is an attended script converted from the mapped test script, the executing the response scrip comprises acquiring user custom information input by the user, and then executing the attended script with the user custom information. Continuing with above example of querying salary, since a task associated with "Query Salary" requires user custom information such as employee's account ID and password (optionally, year and month to query), the user custom information is acquired in an appropriate timing in the process of automatic operation. For example, after opening the log-in page, the user is required to provide the account ID and password, and after log in the account, the user is further required to enter the year and month to query. Then, the acquired user custom information can be used to replace the default information in the test script to execute the attended script to complete the task associated with "Query Salary".

In this example, the processor of the computer can log in the employee's account by running the script with the ID and password provided by the user, and provide the salary statement for a desired month to the user according to the month selected or entered by the user, so as to complete the task. Unlike the automatic operation only providing a result of the task, during the process of completing the task, the user can also be presented with the procedures for executing each step of the script within the UI, so that the user can know the functionality details while being assisted, and thereby achieving an immersive task assistance.

Figure 5:
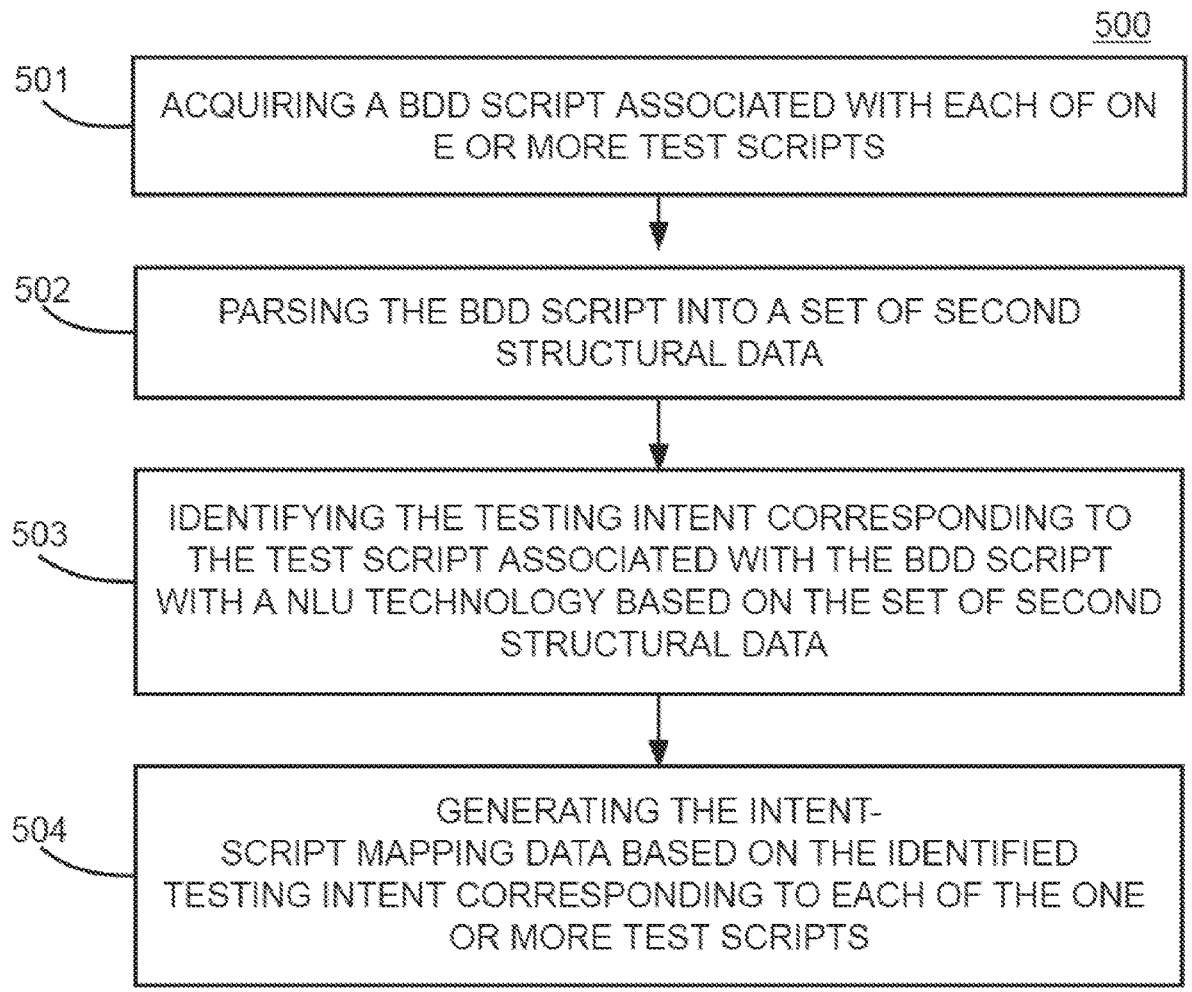
FIG. 5 shows an exemplary flowchart of a computer-implemented method for generating the intent-script mapping data according to an embodiment of the present disclosure.

FIG. 5 shows an exemplary flowchart of a computer-implemented method 500 for generating the intent-script mapping data according to an embodiment of the present disclosure. As shown in FIG. 5, method 500 for generating the intent-script mapping data as mentioned above comprises steps 501-504.

At step 501, a Behavior-Driven Development (BDD) script associated with one or more test scripts can be acquired. As mentioned above, a BDD script can provide testers with an outline for designing a test script, in which the functions to be realized are specified. Therefore, the BDD script associated with the test script can be acquired to identify the testing intent of the test script more accurately. In addition, the BDD script is an existing outcome in the development and design phase, and it will not require additional efforts.

At step 502, the BDD script is parsed into a set of structural data. According to an embodiment of present disclosure, the BDD script can be parsed into a set of structural data by for example using a rule-based approach. As mentioned above and with reference to FIG. 2, the BDD script, by using a Gherkin syntax, can provide a description on the functionality to be implemented. Since such a syntax has a specified format, the main actors (participants) and actions (actions) can be extracted as a set of structural data for further processing. According to an embodiment of present disclosure, the process of parsing may further include filtering and indexing process, for example, stop-words which do not have a substantive meaning, such as "the", "is", "at", "which", "on" and so on, can be excluded from the sentence in the description of the BDD script by filtering process, and a fast index for data can be built by the indexing process to improve the performance of subsequent access.

At step 503, the testing intent corresponding to the test script associated with the BDD script can be identified, based on the set of first structural data, with a natural language understanding (NLU) technology. According to an embodiment of present disclosure, by using NLU technology, such as via Watson language understanding API, the part-of-speech and relationship of structured data can be identified, and thus the main entities (generally, nouns part-of-speech data) and intent (generally, verbs part-of-speech data) in structured data can be determined, and thereby further understanding the main structure, meaning and category of sentences in the BDD script, so as to identify the testing intent corresponding to the test script associated with the BDD script. Details for the NLU are known to those skilled in the art and omitted herein. It can be contemplated that any other information extraction methods based on machine learning or artificial intelligence may be used to extract the required key information.

At step 504, the intent-script mapping data can be generated based on the identified testing intent corresponding to each of the one or more test scripts. After identifying the testing intent of each test script, correspondence between each of one or more test scripts and a testing intent thereof can be established by associating the identified testing intent with the corresponding test script, and thus the intent-script mapping data can be generated.

Through the above embodiment, since a BDD script adopts a description close to natural language, the testing intent of a test script can be identified from a respective BDD script associated with the test script, which is beneficial to a case in which the testing intent cannot be identified merely from the test script. Alternatively, or additionally, it is also possible to identify the testing intent directly from the content of the test script for generating the intent-script mapping data, in such a case, it may not (or optionally) acquire a BDD script associated with the test script.

Figure 6:
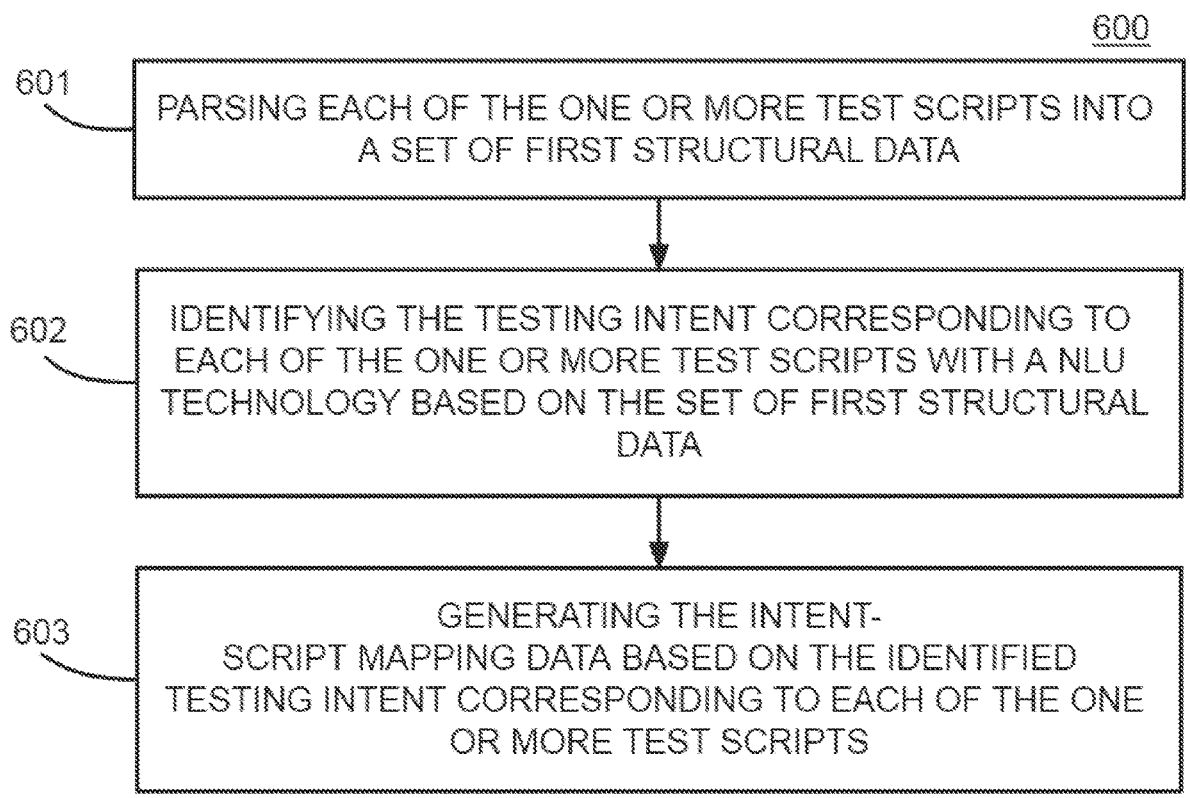
FIG. 6 shows another exemplary flowchart of a computer-implemented method for generating the intent-script mapping data according to an embodiment of the present disclosure.

FIG. 6 shows another exemplary flowchart of a computer-implemented method 600 for generating the intent-script mapping data according to an embodiment of the present disclosure. As shown in FIG. 6, method 600 comprises steps 601-603. It should note that the method 600 may be executed in any of the environments described with reference to accompanying drawings according to the present disclosure.

Unlike the embodiment of parsing BDD script in FIG. 5, at step 601, each of the one or more test scripts can be parsed into a set of first structural data directly without acquiring a BDD script.

Analogous to the embodiment of FIG. 5, at steps 602 and 603, the testing intent corresponding to each of the one or more test scripts can be identified with a NLU technology based on the set of first structural data, and then the intent-script mapping data can be generated based on the identified testing intent.

It should be noted that the methods 500 and 600 as described with reference to FIGS. 5 and 6 may be executed in any of the environments described with reference to accompanying drawings according to the present disclosure. Also, it can be contemplated that any of above two embodiments of or a combination thereof can be implemented to generate the intent-script mapping data indicating a correspondence between each of one or more test scripts and a testing intent thereof. Both embodiments reuse the existing script documents in the development and design stage, which can accurately identify the testing intent corresponding to a test script whiling saving the workload of developers.

According to an embodiment of present disclosure, the method for task assistance may further comprise an interactive response process, in response to the request intent being mapped to a testing intent in the intent-script mapping data.

Figure 7:
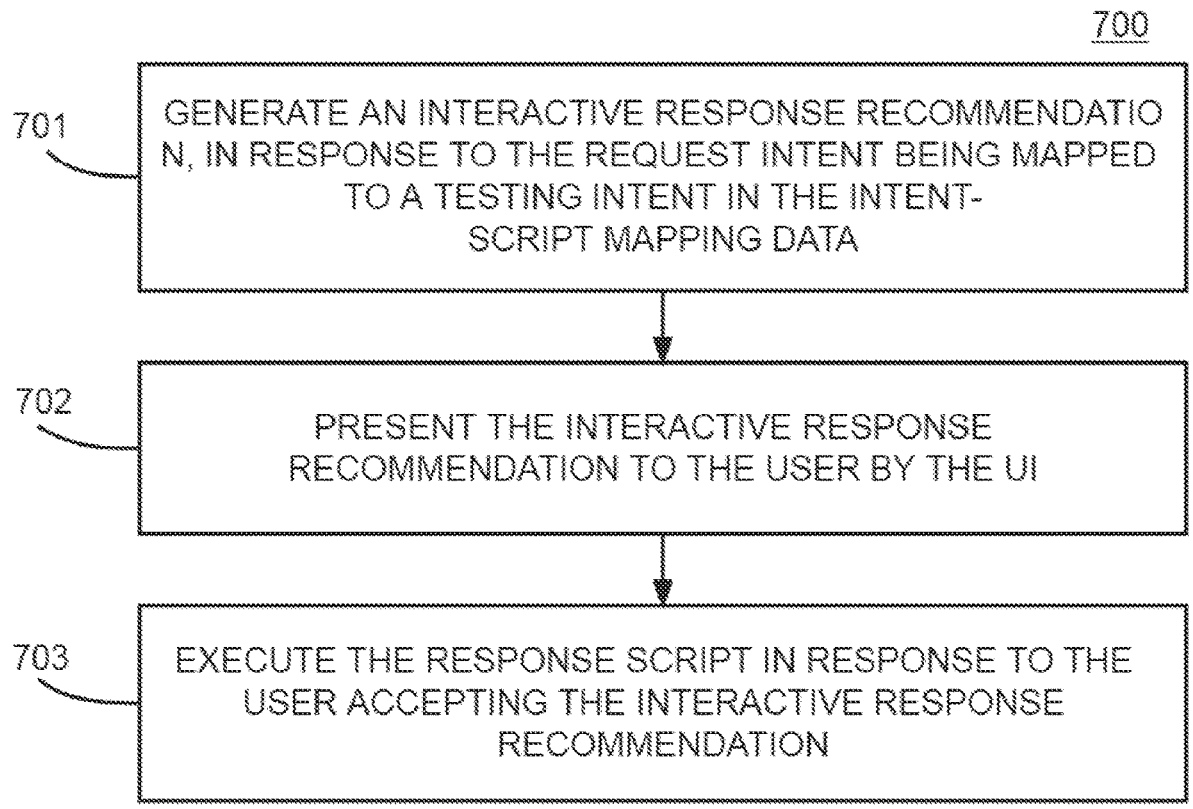
FIG. 7 shows an exemplary flowchart of a computer-implemented method for interactive response according to an embodiment of the present disclosure.

FIG. 7 shows an exemplary flowchart of a computer-implemented method 700 of interactive response according to an embodiment of the present disclosure. As shown in FIG. 7, method 700 comprises steps 701-703. It should be noted that the method 700 may be executed in any of the environments described with reference to accompanying drawings according to the present disclosure.

At step 701, an interactive response recommendation can be generated, in response to the request intent being mapped to a testing intent in the intent-script mapping data.

At step 702, the interactive response recommendation can be presented to the user by the UI.

As mentioned at step 403 hereinbefore, if the request intent can be mapped to a testing intent in the intent-script mapping data, it indicates that there is a matched test script available, and the task will be completed by executing a respective response script corresponding to the request intent. In this embodiment, in order to provide a more immersive interaction with the user, an interactive response recommendation can be generated and provided to the user for selecting whether an interactive response shall be executed for completing the task. For example, the interactive response recommendation can be provided by a way of, including but not limit to, a pop-up window, a dialog with the user by a chatbot, and the like. User can select an option to accept or reject the interactive response recommendation in an appropriated way.

At step 703, the response script can be executed, in response to the user accepting the interactive response recommendation. As mentioned at step 404 hereinbefore, the response script can be executed to complete the task and present the process of running the task in a UI. According to an embodiment of the present disclosure, the response script to be executed at step 703 can be an attended script converted from a test script of the one or more test scripts, in response to the user accepting the interactive response recommendation. In this way, the user can conduct a further interaction to provide user custom information, as described hereinbefore. Alternatively, a conventional task assistance (e.g., a tutorial based assistance) can be employed, in response to the user rejecting the interactive response recommendation, in this way, the task will be completed in a full-automatic manner without user's intervention.

Through the above embodiment, it allows a more flexible task assistance, which can selectively provide a more immersive response or a conventional response depending on the user's selection for the interactive response recommendation.

Figure 8:
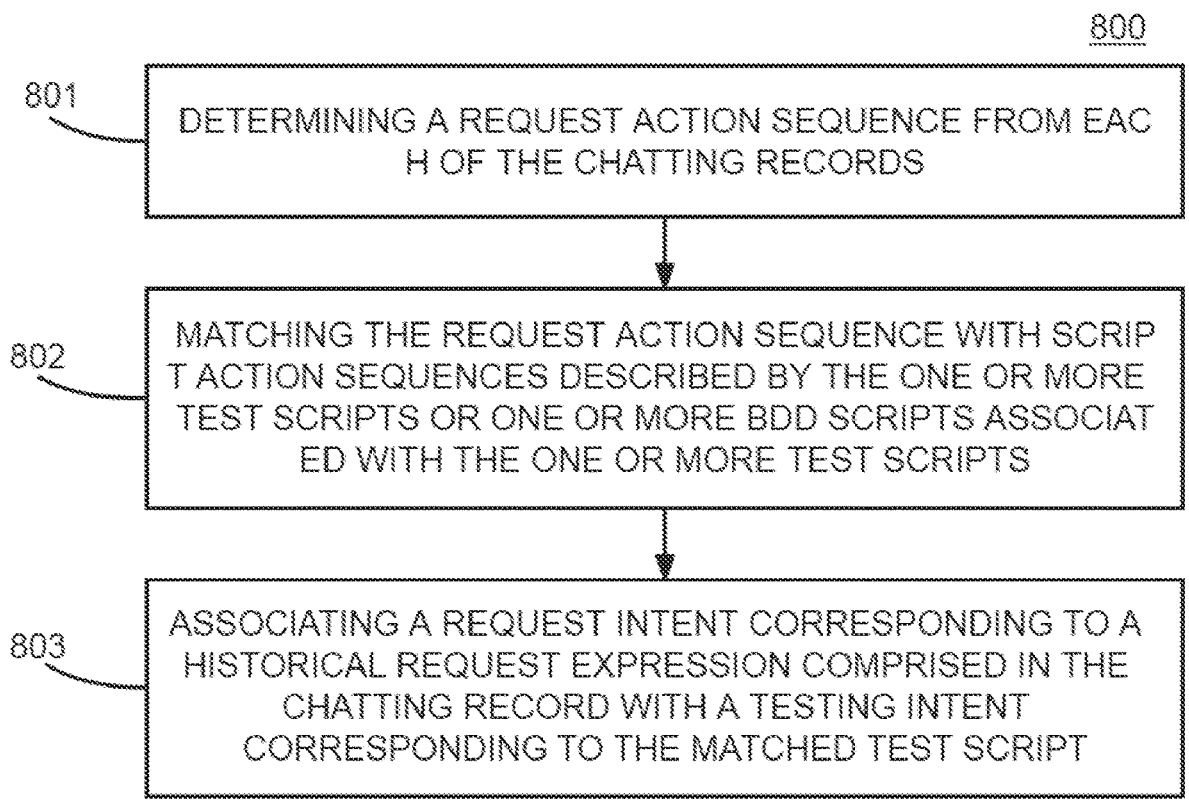
FIG. 8 shows an exemplary flowchart of a computer-implemented method for constructing a classifier to identify the request intent according to an embodiment of the present disclosure.

FIG. 8 shows an exemplary flowchart of a computer-implemented method 800 of constructing a classifier to identify the request intent according to an embodiment of the present disclosure. As mentioned above, in order to train a classifier to identify the request intent, the historical request expressions can be acquired from chatting records between the user and a chatbot or a human customer service, and each of the chatting records is associated with a respective request intent.

Herein, a chatting record may refer to a dialogue between an assistance requester (e.g., a user) and an assistance provider (e.g., a chatbot), and the assistance provider takes corresponding actions, including providing information, opening a window, or redirecting a webpage, or the like, in response to the request of the assistance requester. For example, in order to realize an intent of "Query Salary", the assistance requester may ask the chatbot in different request expressions, such as "I want to get my salary statement", or "please provide my income information". Another possible scenario is that the assistance requester may ask questions continuously but the final result directs to a same intent. For example, the assistance requester may ask "where should I log in my account" at first, and the chatbot may redirect to the log-in page. After logging in his/her account, assistance requester may further ask "where should I check my salary", and the chatbot may present the salary statement in the account, which has a same result as that for the intent of "Query Salary". Therefore, there may be various request expressions for the same request intent.

In order to enrich instances of intent by training a classifier to identify request intents accurately, an embodiment of the present disclosure can provide a method 800. As shown in FIG. 8, method 800 for constructing a classifier as mentioned above comprises steps 801-803. It should note that the method 800 may be executed in any of the environments described with reference to accompanying drawings according to the present disclosure.

At step 801, a request action sequence can be determined from each of the chatting records. As mentioned above, a chatting record may include a sequence of actions by the assistance provider in response to utterances of the assistance requester, and thus the sequence of actions by the assistance provider, namely, the request action sequence, can be determined from each of the chatting records, according to an embodiment of present disclosure. The request action sequence can be retrieved from service SOPs.

At step 802, the determined request action sequence can be matched with script action sequences described by the one or more test scripts or one or more BDD scripts associated with the one or more test scripts. As mentioned above, a test script can be used to perform a sequence of operations for testing a functionality, and BDD script can provide a description of a functionality. Both types of script can describe a sequence of actions to be performed, namely, the script action sequence. By comparing the determined request action sequence with the script action sequences executed by the script, a similarity can be determined. According to an embodiment of present disclosure, the similarity may include step description similarity and/or step sequence similarity, which can indicate similarity of the operation for each step and similarity of the order of all steps. By step 802, each of the chatting records will be matched to a respective test script with a highest similarity.

At step 803, a request intent corresponding to a historical request expression comprised in the chatting record can be associated with a testing intent corresponding to the matched test script. According to an embodiment of present disclosure, the historical request expression acquired from a chatting record may correspond to a testing intent of a test script matched with that chatting record, as determined in step 802. By establishing such an association between a request intent and a testing intent, the classifier may classify the chatting records associated with the same testing intent as the request expressions corresponding to the same intent.

Figure 9:
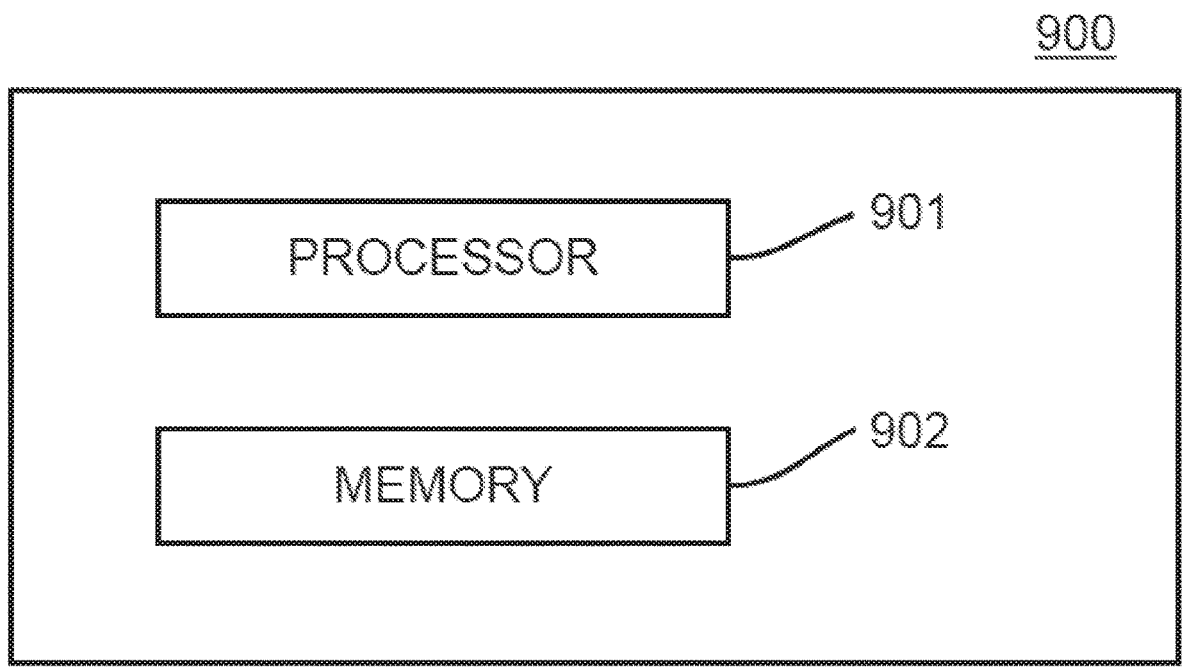
FIG. 9 shows a system for task assistance according to an embodiment of the present disclosure.

FIG. 9 shows a system for task assistance according to an embodiment of the present disclosure. The system 900 for task assistance comprises one or more processors 901 and a memory 902 coupled to at least one of the processors 901.

According to an embodiment of present disclosure, a set of computer program instructions stored in the memory, which, when executed by at least one of the processors, perform actions of: acquiring a request expression input by a user; identifying a request intent associated with a task based on the request expression; determining a response script corresponding to the request intent based on intent-script mapping data, in response to the request intent being mapped to a testing intent in the intent-script mapping data; and executing the response script to complete the task and present the process of running the task in a user interface (UI); wherein the intent-script mapping data indicates correspondence between each of one or more test scripts and a testing intent thereof, and the response script is generated based on a test script of the one or more test scripts.

According to an embodiment of present disclosure, in order to generate the intent-script mapping data, the set of computer program instructions, when executed by the at least one of the processors, further perform actions of: parsing each of the one or more test scripts into a set of first structural data; identifying the testing intent corresponding to each of the one or more test scripts with a natural language understanding (NLU) technology based on the set of first structural data; and generating the intent-script mapping data based on the identified testing intent corresponding to each of the one or more test scripts; alternatively or additionally, the set of computer program instructions, when executed by the at least one of the processors, further perform actions of: acquiring a Behavior-Driven Development (BDD) script associated with each of one or more test scripts; parsing the BDD script into a set of second structural data; identifying the testing intent corresponding to the test script associated with the BDD script with a natural language understanding (NLU) technology based on the set of second structural data; and generating the intent-script mapping data based on the identified testing intent corresponding to each of the one or more test scripts.

According to an embodiment of present disclosure, the set of computer program instructions can further perform an action of generating an interactive response recommendation, in response to the request intent being mapped to a testing intent in the intent-script mapping data; presenting the interactive response recommendation to the user by the UI; and executing the response script in response to the user accepting the interactive response recommendation.

According to an embodiment of present disclosure, the acquiring a request expression input by a user comprises: interacting with the user by a chatbot, to acquire the request expression input by a user.

According to an embodiment of present disclosure, the response script is an attended script converted from a test script of the one or more test scripts; and the executing the response scrip comprises: acquiring user custom information input by the user, and executing the attended script with the user custom information.

According to an embodiment of present disclosure, the identifying a request intent associated with a task based on the request expression comprises: identifying the request intent by using a classifier, wherein the classifier is constructed by using historical request expressions, and wherein the historical request expressions are acquired from chatting records between the user and a chatbot or a human customer service, and each of the chatting records is associated with a respective request intent.

According to an embodiment of present disclosure, in order to construct the classifier, the set of computer program instructions, when executed by the at least one of the processors, further perform actions of: determining a request action sequence from each of the chatting records; matching the request action sequence with script action sequences described by the one or more test scripts or one or more BDD scripts associated with the one or more test scripts; and associating a request intent corresponding to a historical request expression comprised in the chatting record with a testing intent corresponding to the matched test script.

In addition, according to another embodiment of the present disclosure, a computer program product for task assistance is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present invention may be a system, a method, and/or a computer program product at any possible technical detail level of integration. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for task assistance, the method comprising:
acquiring a request expression input by a user;
identifying a request intent associated with a task based on the request expression;

determining a response script corresponding to the request intent, in response to the request intent being mapped to a testing intent in intent-script mapping data; and executing the response script to complete the task and presenting a process of running the task in a user-interface (UI), wherein the intent-script mapping data indicates correspondence between each of one or more tests scripts and a testing intent thereof, and wherein the response script is generated based on a test script of the one or more test scripts.

2. The method of claim 1, wherein generating the intent-script mapping data further comprises:

parsing each of the one or more tests scripts into a set of first structural data;

identifying the testing intent corresponding to each of the one or more test scripts using natural language understanding (NLU) based on the set of first structural data; and generating the intent-script mapping data based on the identified testing intent corresponding to each of the one or more test scripts.

3. The method of claim 1, wherein generating the intent-script mapping data further comprises:

acquiring a Behavior-Driven Development (BDD) script associated with each of the one or more test scripts;

parsing the BDD script into a set of second structural data;

identifying the testing intent corresponding to the test script associated with the BDD script using NLU based on the set of second structural data; and generating the intent-script mapping data based on the identified testing intent corresponding to each of the one or more test scripts.

4. The method of claim 1, further comprising:

generating an interactive response recommendation in response to the request intent being mapped to the testing intent in the intent-script mapping data;

presenting the interactive response recommendation to the user by the UI; and executing the response script in response to the user accepting the interactive response recommendation.

5. The method of claim 1, wherein the acquiring the request expression input by the user further comprises:

interacting with the user by a chatbot to acquire the request expression input by the user.

6. The method of claim 1, wherein the response script is an attended script converted from the test script of the one or more test scripts, and the executing of the response script further comprises:

acquiring user custom information input by the user; and executing the attended script with the user custom information.

7. The method of claim 1, wherein identifying the request intent associated with the task based on the request expression further comprises:

identifying the request using a classifier, wherein the classifier is constructed by using historical request expressions.

8. The method of claim 7, wherein the historical request expressions are acquired from chatting records between the user and a chatbot or customer service, wherein each of the chatting records is associated with a respective request intent.

9. The method of claim 8, wherein constructing the classifier further comprises:

determining a request action sequence from each of the chatting records;

matching the request action sequence with script action sequences described by the one or more tests scripts or one or more BDD scripts associated with the one or more test scripts; and associating the request intent corresponding to a historical request expression comprised in the chatting record with the testing intent corresponding to the matching test script.

10. A computer system for task assistance, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

acquiring a request expression input by a user;

identifying a request intent associated with a task based on the request expression;

determining a response script corresponding to the request intent, in response to the request intent being mapped to a testing intent in intent-script mapping data; and executing the response script to complete the task and presenting a process of running the task in a user-interface (UI), wherein the intent-script mapping data indicates correspondence between each of one or more tests scripts and a testing intent thereof, and wherein the response script is generated based on a test script of the one or more test scripts.

11. The computer system of claim 10, wherein generating the intent-script mapping data further comprises:

parsing each of the one or more tests scripts into a set of first structural data;

identifying the testing intent corresponding to each of the one or more test scripts using natural language understanding (NLU) based on the set of first structural data; and generating the intent-script mapping data based on the identified testing intent corresponding to each of the one or more test scripts.

12. The computer system of claim 10, wherein generating the intent-script mapping data further comprises:

acquiring a Behavior-Driven Development (BDD) script associated with each of the one or more test scripts;

parsing the BDD script into a set of second structural data;

identifying the testing intent corresponding to the test script associated with the BDD script using NLU based on the set of second structural data; and generating the intent-script mapping data based on the identified testing intent corresponding to each of the one or more test scripts.

13. The computer system of claim 10, further comprising:

generating an interactive response recommendation in response to the request intent being mapped to the testing intent in the intent-script mapping data;

presenting the interactive response recommendation to the user by the UI; and executing the response script in response to the user accepting the interactive response recommendation.

14. The computer system of claim 10, wherein the acquiring the request expression input by the user further comprises:

interacting with the user by a chatbot to acquire the request expression input by the user.

15. The computer system of claim 10, wherein the response script is an attended script converted from the test script of the one or more test scripts, and the executing of the response script further comprises:
  acquiring user custom information input by the user; and
  executing the attended script with the user custom information.

16. A computer program product for task assistance, comprising:
  one or more computer readable storage media, and program instructions collectively stored on the one or more computer readable storage media, the program instructions comprising:
  acquiring a request expression input by a user;
  identifying a request intent associated with a task based on the request expression;
  determining a response script corresponding to the request intent, in response to the request intent being mapped to a testing intent in intent-script mapping data; and
  executing the response script to complete the task and presenting a process of running the task in a user-interface (UI), wherein the intent-script mapping data indicates correspondence between each of one or more tests scripts and a testing intent thereof, and wherein the response script is generated based on a test script of the one or more test scripts.

17. The computer program product of claim 16, wherein generating the intent-script mapping data further comprises:
  parsing each of the one or more tests scripts into a set of first structural data;
  identifying the testing intent corresponding to each of the one or more test scripts using natural language understanding (NLU) based on the set of first structural data; and
  generating the intent-script mapping data based on the identified testing intent corresponding to each of the one or more test scripts.

18. The computer program product of claim 16, wherein generating the intent-script mapping data further comprises:
  acquiring a Behavior-Driven Development (BDD) script associated with each of the one or more test scripts;
  parsing the BDD script into a set of second structural data;
  identifying the testing intent corresponding to the test script associated with the BDD script using NLU based on the set of second structural data; and
  generating the intent-script mapping data based on the identified testing intent corresponding to each of the one or more test scripts.

19. The computer program product of claim 16, further comprising:
  generating an interactive response recommendation in response to the request intent being mapped to the testing intent in the intent-script mapping data;
  presenting the interactive response recommendation to the user by the UI; and
  executing the response script in response to the user accepting the interactive response recommendation.

20. The computer program product of claim 16, wherein the acquiring the request expression input by the user further comprises:
  interacting with the user by a chatbot to acquire the request expression input by the user.

* * * * *